Figure 1:
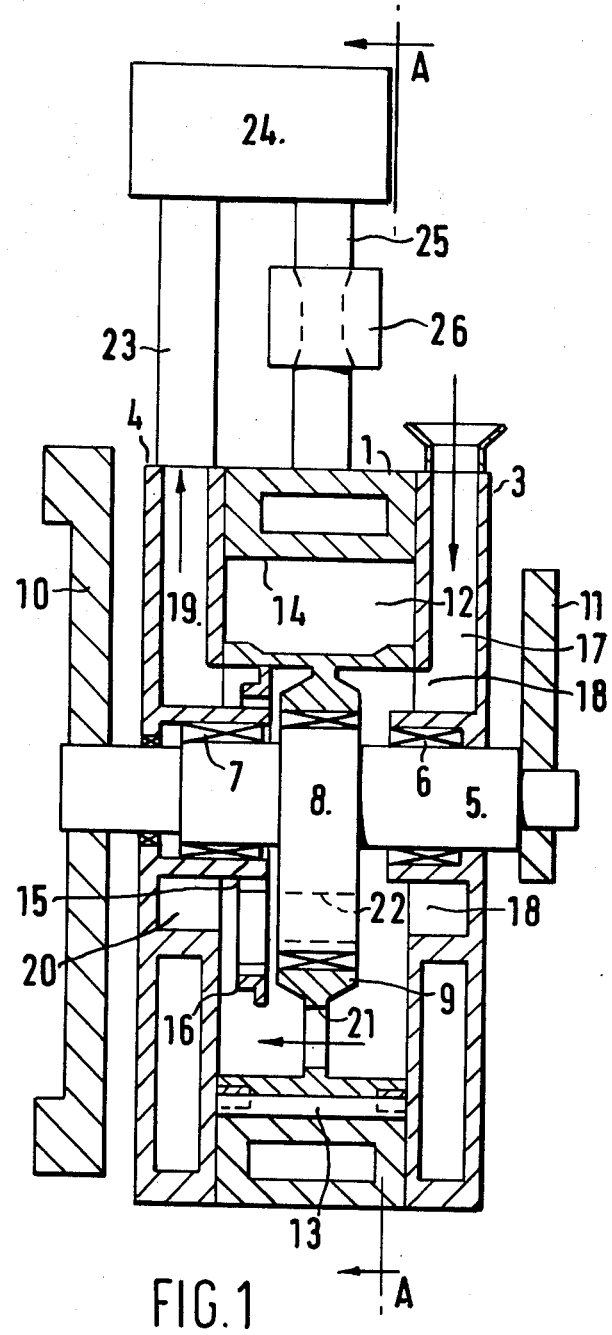

United States Patent [19]

Carside

[11] 4,000,721
[45] Jan. 4, 1977

[54] ROTARY INTERNAL COMBUSTION ENGINES

[75] Inventor: David Walker Carside, Solihull, England

[73] Assignee: The Birmingham Small Arms Company Limited, Birmingham, England

[22] Filed: Feb. 11, 1976

[21] Appl. No.: 657,044

Related U.S. Application Data

[63] Continuation of Ser. No. 529,085, Dec. 3, 1974, abandoned, which is a continuation of Ser. No. 271,813, July 14, 1972, abandoned.

[30] Foreign Application Priority Data

July 17, 1971 United Kingdom ............ 33676/71
Apr. 29, 1972 United Kingdom ............ 19988/72

[52] U.S. Cl. ................................ 123/8.01; 418/86
[51] Int. Cl.² ........................................ F02B 55/06
[58] Field of Search ......... 123/8.01, 8.45, 119 CD, 123/122 D; 418/61 A, 86

[56] References Cited

UNITED STATES PATENTS

| | | | |
|---|---|---|---|
| 1,425,054 | 8/1922 | Ricardo | 123/122 D |
| 2,195,082 | 3/1940 | Dugelay | 123/119 CD |
| 2,298,525 | 10/1942 | Briggs | 418/86 X |
| 2,346,463 | 4/1944 | Szekely | 123/119 CD UX |
| 2,372,272 | 3/1945 | Helmore | 123/119 CD UX |
| 2,983,265 | 5/1961 | Robbins et al. | 123/119 CD |
| 3,180,323 | 4/1965 | Paschke | 418/86 X |
| 3,450,109 | 6/1969 | Gratzmuller | 123/119 CD |
| 3,561,894 | 2/1971 | King | 418/86 |
| 3,779,214 | 12/1973 | Ward et al. | 418/86 X |

FOREIGN PATENTS OR APPLICATIONS 188,794  9/1967  U.S.S.R. ............................ 418/86

OTHER PUBLICATIONS

"Entwicklung eines Rotationskolden motors mit gemisch-gekuhltem Kolbenlaufer," by Yamaoka et al., MTZ *Motortechinische Zeitschrift* 34 (1973) 6, pp. 181–187.

Primary Examiner—Carlton R. Croyle
Assistant Examiner—Michael Koczo, Jr.
Attorney, Agent, or Firm—Norris & Bateman

[57] ABSTRACT

A rotary internal combustion engine having an induction passage formed in part in the rotor of the engine, whereby the inducted air flows through and cools the rotor, has a heat exchanger adapted to cool the air flowing from the rotor before it is inducted into the working chambers of the engine. The heat exchanger may be arranged to be operable only when the region is operating at or above a predetermined load.

1 Claim, 4 Drawing Figures

ROTARY INTERNAL COMBUSTION ENGINES

This is a continuation of application Ser. No. 529,085, filed Dec. 3, 1974, which was a continuation of application Ser. No. 271,813 filed July 14, 1972 both now abandoned.

This invention relates to rotary piston internal combustion engines of the kind in which a rotor rotates within a cavity of a housing, the rotor and cavity being so shaped that between them are formed working chambers which vary in volume as the rotor rotates. The best known example of an engine of the kind referred to comprises a stationary housing having a two-lobed epitrochoidal cavity in which rotates in planetary manner a rotor of generally equilateral triangular shape, the apices of the rotor maintaining sealing contact with the wall of the cavity and thereby forming three working chambers. The invention particularly relates to engines of the kind referred to which have air-cooled rotors, passageways being formed in the rotor which align with a passageway or passageways in the housing and which form a part of the induction passage to the working chambers of the engine such that inducted air is drawn through, and thereby cools, the rotor. Fuel is conventionally dispensed into the inducted air either close to the air intake point such that it is air/fuel mixture which flows through the rotor, or, by means of a fuel injection system, directly into the working chambers of the engine.

A disadvantage of cooling the rotor with the inducted air, particularly when the engine is operating at or near full load, is that the air in cooling the rotor itself becomes heated and thereby results in a reduction of the volumetric efficiency and the power output of the engine.

It is an object of the invention to provide a means of cooling the induction air flow after it has passed through the rotor and before it is inducted into the working chambers of the engine.

According to the invention a rotary piston internal combustion engine comprising a housing having a cavity and a rotor rotatable in the cavity, the cavity and the rotor being so shaped that between them are formed working chambers which vary in volume as the rotor rotates, an induction passage to the working chambers of the engine being formed in part in the rotor, is characterized by the fact that it has a heat exchanger operable to cool the air flowing through the induction passage after it has passed through the rotor.

The heat exchanger may be an air-to-air heat exchanger having adequate contact area with the induction air flow and ambient air to achieve a satisfactory heat transfer rate between them. The supply of coolant air to the heat exchanger may be simply derived from convection and incidental air currents generated, for example, when a vehicle fitted with an engine according to the invention is in motion or alternatively the heat exchanger may be provided with a forced air supply.

In addition to the cooling of the rotor it is necessary to provide in engines of the kind referred to means for cooling the housing and the means for cooling the housing may be utilised to provide also a coolant supply to the heat exchanger. For example, the housing may be provided with passageways through which is passed a cooling fluid which may be air or water, and the passageways and the heat exchanger may be so arranged that the cooling fluid forms the coolant supply to the heat exchanger.

Whilst it is possible to operate an engine according to the invention in such a manner that the induction air flow passes through the heat exchanger continuously it may be advantageous, and this forms a further feature of the invention, to arrange the heat exchanger to be operable only when the engine is operating at a load above a predetermined value.

The functioning of the heat exchanger under high engine-load conditions only means that the increase in engine performance which is derived by the cooling of the induction air flow after it has passed through the rotor is obtained only when it is needed and under light and moderate loads the engine operates conventionally. The non-cooling of the induction air flow, whilst reducing engine potential performance of the engine compared with the cooled induction air flow (which reduction is not of importance at light and moderate engine loads), does confer the advantage that the warmed air inducted into the working chambers of the engine tends to promote better fuel/air mixing which in turn gives better combustion, fuel economy and lower exhaust contaminants. Further advantages lie in the fact that for a given part load the throttle valve will be wider open when the induction air flow is uncooled by the heat exchanger and thereby tends to result in reduced pumping losses and hence reduced fuel consumption. A still further advantage of utilising the heat exchanger only when the engine is operating under high load conditions is that the heat exchanger is cooler than it would be if it were in continuous operation and therefore operates more efficiently, particularly when the engine operates under high load conditions for intermittent periods of short duration. The induction air flow may be caused to pass through the heat exchanger by the provision of a suitable valve in the induction passage. The valve may be connected to the carburetter by a suitable linkage such that it causes the induction air flow to pass through the heat exchanger when the carburetter is at or near full throttle. Alternatively the valve may be responsive to the pressure in the induction passage and thereby operate automatically.

Figure 2:
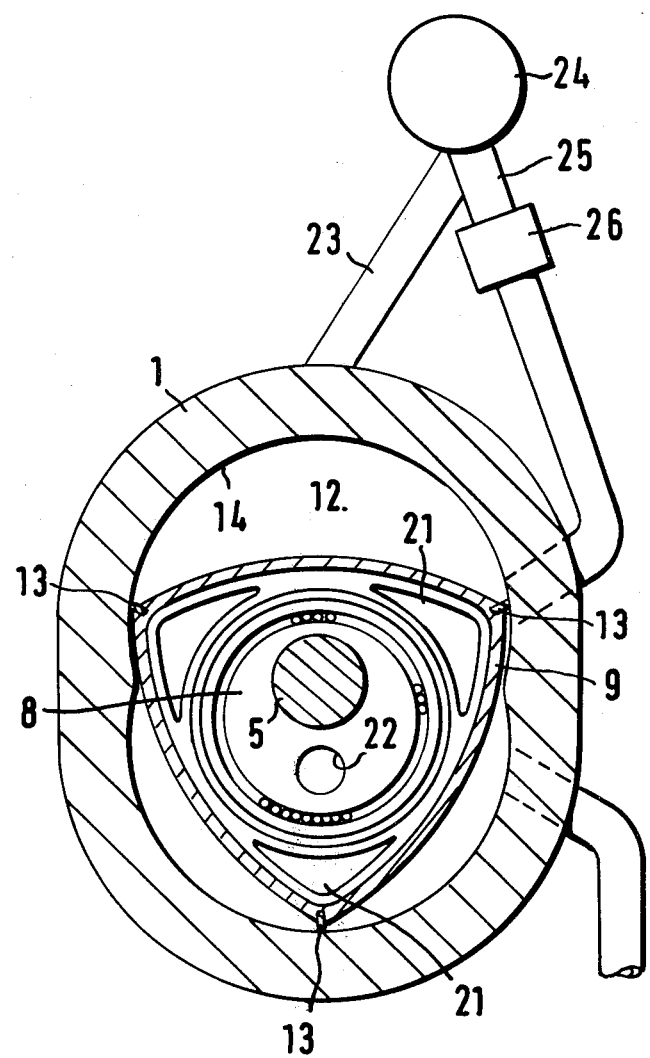
Figure 3:
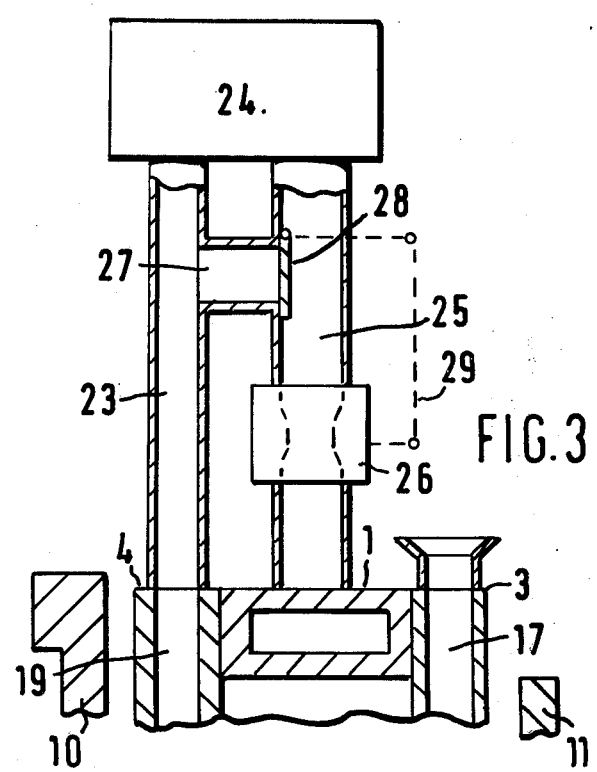
Figure 4:
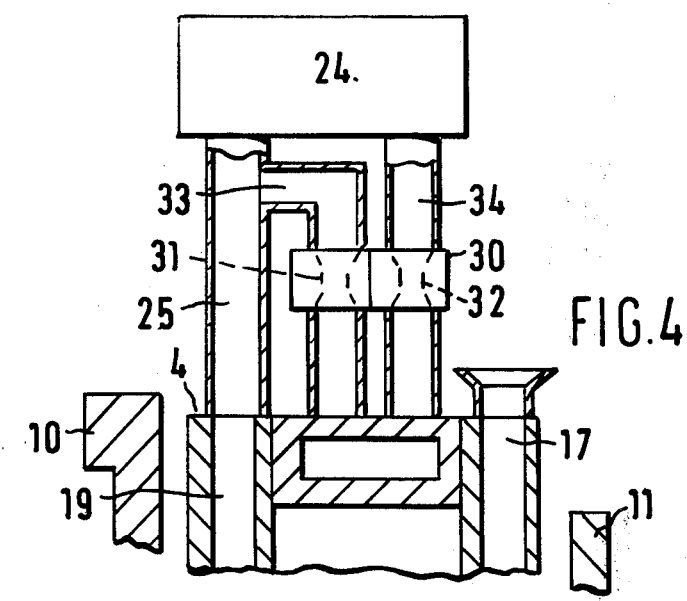

Embodiments of the invention will now be described, by way of example, with reference to the accompanying drawings in which like reference numbers refer to like parts and in which:

FIG. 1 is a diagrammatic cross-section through a rotary piston engine according to the invention, FIG. 2 is a cross-section along the line A—A of FIG. 1, FIG. 3 is a diagrammatic cross-section through a rotary piston engine being an alternative embodiment of the invention, and FIG. 4 is a diagrammatic cross-section through a rotary piston engine being a further alternative embodiment of the invention.

Referring firstly to FIGS. 1 and 2, the engine is of the well known type in which the housing has a two-lobed epitrochoidal bore and the rotor is of generally equilateral triangular shape, as can be seen most clearly in FIG. 2. The housing comprises a center number 1 having a two-lobed epitrochoidal bore 12 therethrough and end-plates 3 and 4. A shaft 5 is rotatably mounted in bearings 6 and 7 in the end-plates 3 and 4 respectively and has eccentric journal 8 on which is rotatably mounted a rotor 9. A flywheel 10 and balance weight 11 are mounted at opposite ends of the shaft 5. The rotor 9 has a sealing strip 13 disposed at each of its three apices, each sealing strip 13 maintaining sealing contact between the apices and the wall 14 of the bore 12 as the rotor rotates in planetary manner within the bore. The planetary motion of the rotor 9 is controlled by an externally toothed stationary gear 15 which meshes with internally toothed gear 16 carried by the rotor.

The end-plate 3 has an air inlet passage 17 which has openings 18 disposed to either side of the bearing 6, the openings 18 being so shaped as to be contained within the inner envelope of rotation of the side seals on the rotor which effect a gas tight seal between the sides of the rotor and the end-plates 3 and 4.

The other end-plate 4 is similarly provided with a passage 19 and openings 20 and air can flow from openings 18 to openings 20 through the interior of the rotor, there being provided apertures 21 in the web of the motor to allow air flow therethrough. Additionally one or more apertures 27 may be formed in the journal 8 to allow a cooling flow of air therethrough. A duct 23 connects the passage 19 with a heat exchanger 24 which is connected by duct 25 to the inlet port to the working chambers of the engine, a carburettor 26 being disposed in the duct 25. The air inducted to the working chambers of the engine flows in sequence through the passage 17, the rotor (which is thereby cooled), the passage 19, the duct 23, the heat exchanger 24 and the duct 25, the carburettor 26 dispensing fuel into the air flowing through the duct 25. The air in passing through the rotor 8 becomes heated and in subsequently passing through the heat exchanger 24 becomes cooled prior to its induction into the working chambers of the engine.

The heat exchanger 24, may be of any suitable type which produces the desired cooling effect and conveniently is an air-to-air heat exchanger in which the ambient air is the coolant. The heat exchanger may have internal and/or external fins to provide the necessary area of contact to achieve the desired heat exchange rate.

The embodiment of the invention shown in FIG. 3 is a modification of the first embodiment in which a bypass 27 is provided between the ducts 23 and 25. A valve 28 is adapted to open and close the bypass 27 and is operated by a linkage 29 linking the valve with the throttle of the carburettor. The valve is arranged to operate such that when the carburettor is not operating at or near full throttle the valve 28 opens the bypass 27, in which position the valve closes the part of the duct 25 leading to the heat exchanger, and the induction air flow passes directly from the duct 23 to the duct 25 and is not cooled by the heat exchanger 24. When the carburettor is operating at or near full throttle, however, the linkage 29 actuates the valve 28 to close the bypass 27 such that the induction air flow passes through the heat exchanger and is thereby cooled prior to its induction into the working chambers of the engine. The operation of the heat exchanger only at or near full load conditions is advantageous for the reasons hereinbefore given.

The embodiment of the invention shown in FIG. 4 represents an alternative method of achieving the operation of the heat exchanger only at or near full load conditions and involves the use of a twin-choke carburettor. The twin-choke carburettor 30 has a first choke 31 which is operable at part load conditions and a second choke 32 which is operable at high load conditions. The choke 31 is positioned in a duct 33 which is connected directly to the duct 23 and so air flowing therethrough is uncooled by the heat exchanger 24. The choke 32 is positioned in a duct 34 which is connected to the heat exchanger 24 so that air flowing therethrough from the duct 23 is cooled by the heat exchanger 24. This arrangement results, therefore, in the cooling of the induction air flow only at high load conditions.

All three described embodiments of the invention utilise the arrangement in which a carburettor is disposed in the induction passage after the heat exchanger and, whilst we prefer to use such an arrangement, it should be realised that the invention is not limited to the use of a carburettor, as opposed to fuel injection, nor to any particular diposition of a carburettor in the induction passage. The placing of the carburettor downstream of the heat exchanger is advantageous in that it produces a further cooling effect on the induction air flow, due to the extraction therefrom of the latent heat of evaporation of the fuel, which cooling it would be difficult to effect with the heat exchanger due to the lower temperature difference between the induction air flow and ambient air.

Whilst the invention has been described with reference to a single rotor engine it will be apparent that it is equally applicable to engines of the kind referred to having two or more rotors.

What I claim is:

1. A rotary piston internal combustion engine comprising a housing having a two lobed epitrochoidal bore therethrough, a mainshaft mounted axially within said bore, a rotor of generally equilateral triangular shape mounted on an eccentric journal of the mainshaft for planetary rotation within the bore such that its apices maintain sliding contact with the wall of the bore and thereby form three working chambers which vary in volume as the rotor rotates, said housing having an inlet port leading to said working chambers, means providing axial cooling passages through said rotor, end plates secured to the housing and forming axially spaced end walls closing the bore, a first cooling air induction port in one of the end plates positioned to communicate with said axial cooling passages in the rotor, a second port formed in the outer end plate also positioned to communicate with said axial cooling passages in the rotor, a conduit having a portion external of said engine connecting the second port to said inlet port, air inducted into the working chambers thereby flowing successively through the first port, said rotor cooling passages, the second port and said conduit, a heat exchanger interposed in said external conduit portion so arranged that the induction air flowing through the conduit constitutes substantially the sole heat input to the heat exchanger, said heat exchanger being adapted to dissipate heat from the induction air flowing through said conduit whereby the temperature difference between the induction air flowing through said conduit and ambient air may be reduced, a bypass whereby the induction air flowing through the conduit can bypass the heat exchanger means for selectively opening and closing the bypass passage and means responsive to engine load for operating said bypass passage opening and closing means.

* * * * *